(12) United States Patent
Hoppe et al.

(10) Patent No.: US 6,713,145 B2
(45) Date of Patent: Mar. 30, 2004

(54) MOVABLE TRANSPARENT COMPOSITE SYSTEMS AND A PROCESS FOR PREPARING THE SAME

(75) Inventors: Hans-Georg Hoppe, Leichlingen (DE); Jürgen Winkler, Langenfeld (DE); Bernd Willenberg, Gladbach (DE); Henricus Peerlings, Solingen (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 10/313,563

(22) Filed: Dec. 6, 2002

(65) Prior Publication Data

US 2003/0108735 A1 Jun. 12, 2003

(30) Foreign Application Priority Data

Dec. 10, 2001 (DE) .......................... 101 60 571

(51) Int. Cl.[7] ................................ B32B 3/10
(52) U.S. Cl. .......................... 428/61; 428/58
(58) Field of Search ..................... 428/61, 58

(56) References Cited

U.S. PATENT DOCUMENTS 4,540,622 A * 9/1985 Brunion et al. ............. 428/216
5,348,791 A * 9/1994 Thompson et al. ......... 428/184
6,294,638 B1 * 9/2001 Manning et al. ............. 528/76

FOREIGN PATENT DOCUMENTS

| DE | 195 10 637 | | 7/1996 |
| DE | 199 23 683 | * | 11/2000 |
| DE | 199 34 269 | | 1/2001 |
| EP | 0 279 346 | | 8/1988 |
| GB | 2 127 742 | * | 4/1984 |

* cited by examiner

Primary Examiner—Alexander S. Thomas
(74) Attorney, Agent, or Firm—Joseph C. Gil; John E. Mrozinski, Jr.

(57) ABSTRACT

The present invention is directed to transparent light-stable, movable composite systems which are composed of i) at least two rigid parts made of transparent, thermoplastic materials which are joined together by ii) at least one flexible connecting member made of transparent, light-stable thermoplastic polyurethane. The present invention is also directed to a process for preparing the transparent, light-stable movable composite systems of the present invention.

Composite systems of the present invention are particularly useful in the building and construction industry. Upon being folded, composite systems of the present invention are very compact and, hence, easily transportable. In addition, composite systems of the present invention can be easily and reversibly folded or unfolded.

13 Claims, 4 Drawing Sheets

MOVABLE TRANSPARENT COMPOSITE SYSTEMS AND A PROCESS FOR PREPARING THE SAME

TECHNICAL FIELD OF THE INVENTION

The present invention is directed to transparent, light-stable, movable composite systems which are composed of i) at least two rigid parts made of transparent, thermoplastic materials which are joined together by ii) at least one flexible connecting member made of transparent, light-stable thermoplastic polyurethane ("TPU"). The present invention is also directed to a process for preparing the transparent, light-stable, movable composite systems of the present invention.

BACKGROUND OF THE INVENTION

Polycarbonates are transparent, strong, heat resistant and have good electrical properties. These properties make polycarbonates useful in numerous industrial applications. A summary of the production, properties and applications of polycarbonates is illustrated in, for example, Becker et al., "Kunststoff Handbuch: Polycarbonate, Polyacetale, Polyester, Celluloseester", Vol. 3/1 (Munich, Vienna, Carl Hanser Verlag) (1992) as well as in Legrand et al., "Handbook of Polycarbonate Science and Technology", New York, Basel, (Marcel Dekker) (2000).

TPUs have good elastomeric properties and melt processability. A summary of the production, properties and applications of TPU's is given in, for example Becker et al., "Kunststoff Handbuch: "Polyurethane", Munich, Vienna, (Carl Hanser Verlag) (1983) and in Szycher, "Handbook of Polyurethanes" (CRC Press LLC, Boca Raton, Fla.) (1999).

Composite systems which are composed of polycarbonate and TPUs as laminates are known. Such composite systems are particularly useful as, for example, laminated safety systems combined with glass (laminated safety glass). See, for example, EP-A 85006.

Integral or film hinges are described in, for example, Kunz et al., "Neue Konstruktionsmöglichkeiten mit Kunststoffen" Vol. 5 (Augsburg) (1991) as well as in "Kunststoff-Taschenbuch" (1992). Such hinges can be movable or permanent joints which are formed by the extreme narrowing of the cross-section in injection molded parts. Film hinges of this type are typically produced from the same material as the rigid parts which they connect. Flexibility is typically achieved exclusively through an extreme reduction in thickness. Partly crystalline polymers, preferably, polyolefins, are typically used for the production of these film hinges. Often, these polyolefins are not completely transparent.

SUMMARY OF THE INVENTION

One object of the present invention is to provide transparent, light-stable, movable composite systems which are composed of i) at least two rigid parts made of transparent, thermoplastic materials which are joined together by ii) at least one flexible connecting member made of transparent, light-stable TPU.

Another object of the present invention is to provide a process for preparing the transparent, light-stable movable composite systems of the present invention.

DESCRIPTION OF THE INVENTION

Figure 1:
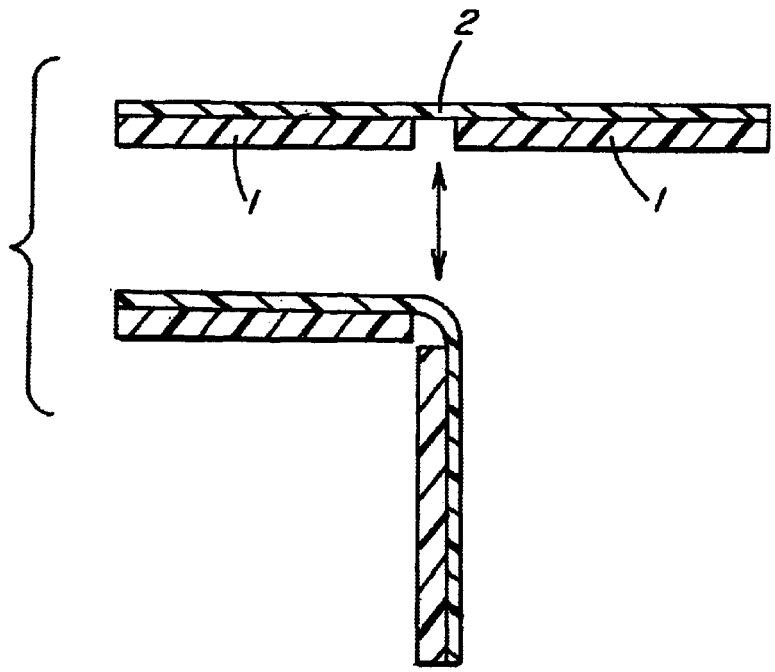
FIGS. 1–8 illustrate cross-sectional views of composite systems of the present invention in the unfolded and the folded state.

The present invention is directed to transparent, light-stable, movable composite systems which are composed of i) at least two rigid parts made of transparent, thermoplastic materials of the group consisting of polycarbonate, polymethylene methacrylate, polyvinylbutyrate, polyamide, polybutylene terephthalate, polyethylene terephthalate, polyvinyl chloride, ethylenevinylacetate copolymer and mixtures and blends thereof which are joined together at one edge by ii) at least one flexible connecting member made of transparent, light-stable TPU having a 0 to 20% haze value at a thickness of 1 mm (according to ISO 14782), a Shore hardness within the range of from about 60 Shore a to about 70 Shore D (according to ISO 868) and a yellowness index of 0 to 25 at a thickness of 1 mm (according to ASTM E 313), the connecting member forming a reversiblejoint which can be folded by an angle of up to 180°.

The present invention is also directed to a process for preparing the transparent, light-stable, movable composite systems of the present invention.

Preferably, the transparent, thermoplastic material of the present invention is transparent polycarbonate.

Preferably, the parts made of transparent, thermoplastic materials of the present invention have a thickness within the range of from 50 $\mu$m to about 2 mm.

The parts made of the transparent, thermoplastic materials of the present invention can be in the form of solid or twin-wall or three-dimensional sheets.

Preferably, TPUs for the connecting member of the present invention are transparent, flexible and light stable. TPUs such as these which are described in, for example, EP-A 1 090 940, are useful in the present invention. More preferably, the TPUs of the present invention are prepared from at least one aliphatic TPU.

The connecting members of the TPUs of the present invention preferably have a thickness within the range of from about 100 $\mu$m to about 2 mm.

TPUs of the present invention have a 0 to 20% haze value at a thickness of 1 mm, as measured according to the American Society for Testing and Materials ("ASTM") standard D 1003-97 (corresponding to ISO 14 782); a Shore hardness within the range of from about 60 Shore A to about 70 Shore D, as measured according to test method DIN 53 505 (corresponding to ISO 868); and a yellowness index of 0 to 25 at a thickness of 1 mm, as measured according to the yellowness indexes of DIN 6167 (corresponding to ASTM E 313).

The connecting members made of TPU of the present invention can be located over either just a part of the surface or over the whole surface of the parts made of transparent thermoplastic material of the present invention.

One key advantage of the flexible, transparent connecting members made of TPU used in the present invention is their high mechanical load-bearing capacity. For example, the connecting members used in the present invention have a higher flexural fatigue strength than typical hinges such as, for example, film hinges.

Another advantage provided by the connecting members of the present invention is their mobility about any spatial axes. By comparison, film hinges known in the art typically only ensure mobility about a rotary axis.

In one embodiment of the present invention, the transparent, light-stable movable composite systems are composed of at least two three-dimensional, transparent molded parts of thermoplastic materials which are joined together by at least one flexible, transparent connecting member of TPU, thus forming a flexible, transparent, movable composite system.

In another embodiment of the present invention, the transparent, light-stable, movable composite systems are composed of at least two transparent polycarbonate sheets joined together by at least one flexible, transparent, light-stable connecting member of TPU. The TPU can be applied to either a part of the surface or the whole surface of the polycarbonate sheets. The TPU can be applied to either one side or both sides of the polycarbonate sheets.

"Polycarbonate sheets" as used herein refers not only to solid sheets but also to twin-wall sheets as well as to three-dimensional sheets. Three-dimensional polycarbonate sheets which can be used in the present invention include, for example, corrugated sheets of polycarbonate.

In a preferred embodiment of the present invention, the transparent, movable composite systems are composed of at least two transparent polycarbonate parts which are joined together by at least one flexible connecting member of transparent, aliphatic TPU.

The connecting members of the present invention can be joined to at least one of the parts of thermoplastic materials of the present invention by, for example, an adhesive. The adhesive can be applied to either the surface of the connecting member and/or to the surface of the parts.

The connecting member of the present invention can also be joined to the parts of the present invention by lamination. During lamination, a bond is formed between the TPU of the connecting member and the thermoplastic material of the parts by continuous or discontinuous pressing at an elevated temperature and/or pressure.

In order to obtain acceptable adhesion of the TPU to the thermoplastic material(s) during lamination, the thermoplastic material(s) should preferably be kept at a temperature above 50° C. during the production process. Special laminating processes such as high-frequency (HF) welding are preferably used.

HF welding is based on local fusion of the polymer caused by the application of a high-frequency field, with adhesion taking place when the material has solidified. HF welding is described in, for example, Sächtling, *Kunststoff-Taschenbuch,* 24$^{th}$ edition, pages 196 to 197 (Hanser-Verlag) (1989).

Composite systems of the present invention may also be produced by two-component injection molding. In a two-component injection molding process, a molded article of thermoplastic material having at least two parts is injection molded and joined to a connecting member made of TPU which is produced in the same mold. Two-component injection molding processes are described in, for example, Ehrenstein et al., *Mehrkomponentenspritzgießen-Technologie, Prozess und Verbundeigenschaften* (Düsseldorf 1997).

Composite systems of the present invention may also be produced by co-extrusion or extrusion coating. In a co-extrusion process, the thermoplastic material and TPU, both in liquid form, are brought together either in an extruder head or directly downstream of the extruder head. In the case of extrusion coating, the melted TPU is applied either over part of or the entire width of the parts made of the thermoplastic material(s).

Composite systems of the present invention are particularly useful in the building and construction industry. For example, composite systems of the present invention can be used as folding roofs, as folding blinds or as movable, alignable supports for photovoltaic solar energy collectors.

Upon being folded, the composite systems of the present invention are very compact and, hence, easily transportable. In addition, composite systems of the present invention can be easily and reversibly folded or unfolded.

Figure 2:
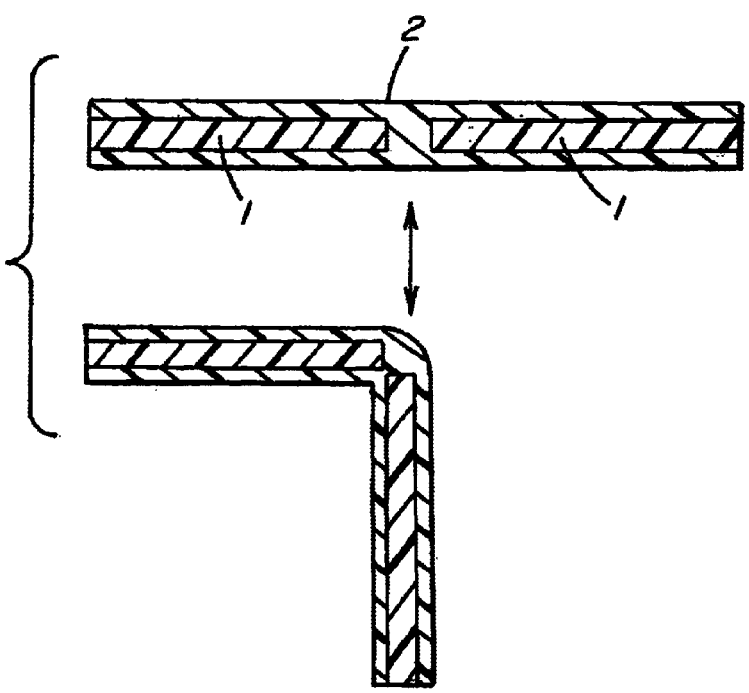
Figure 3:
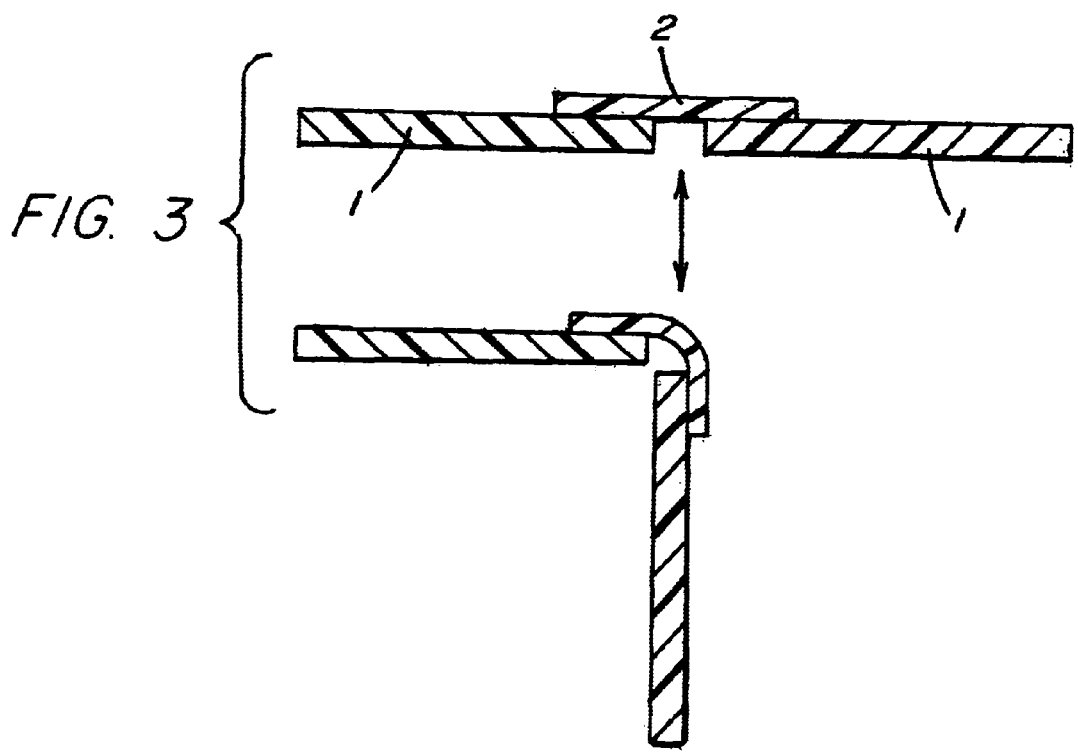
Figure 4:
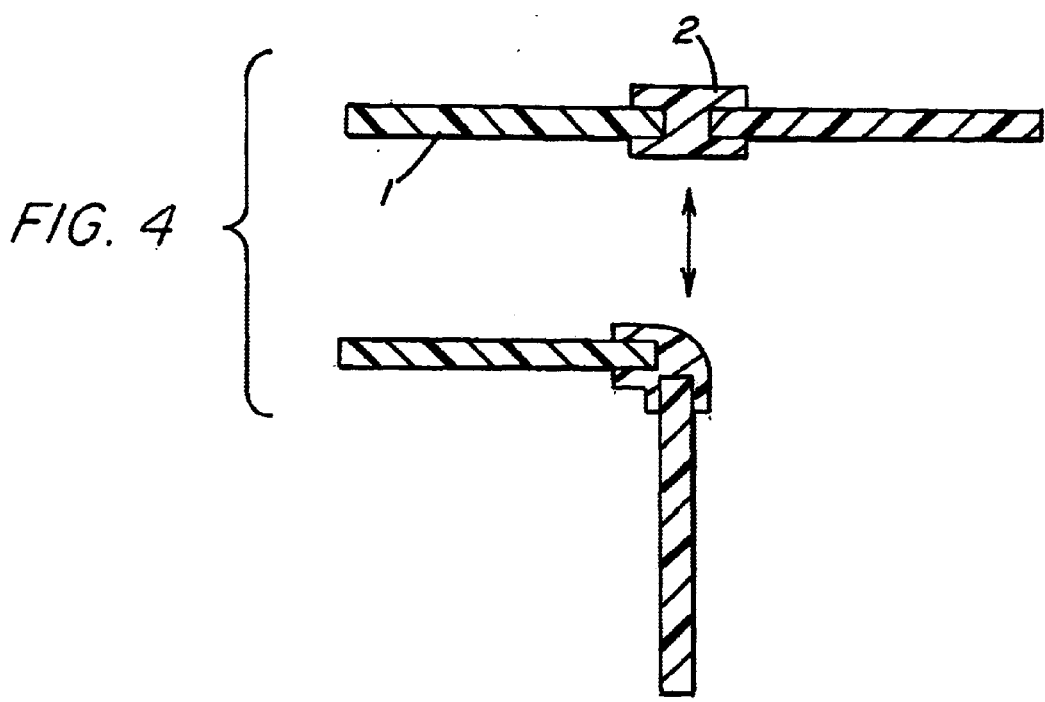
Figure 5:
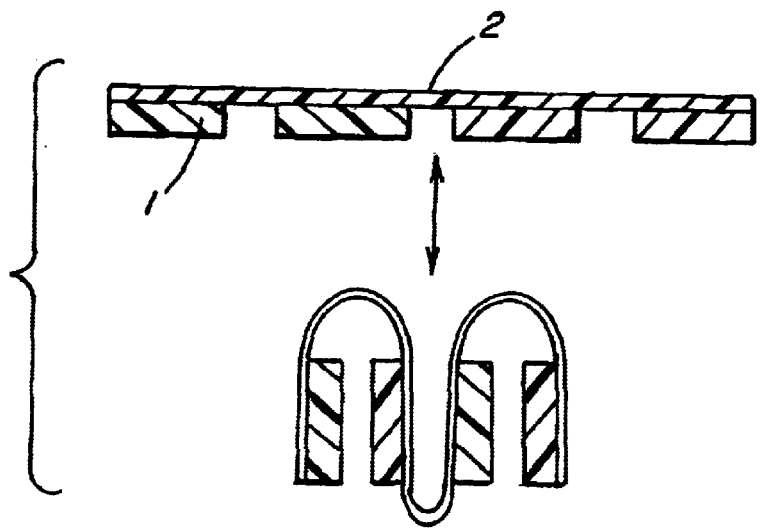
Figure 6:
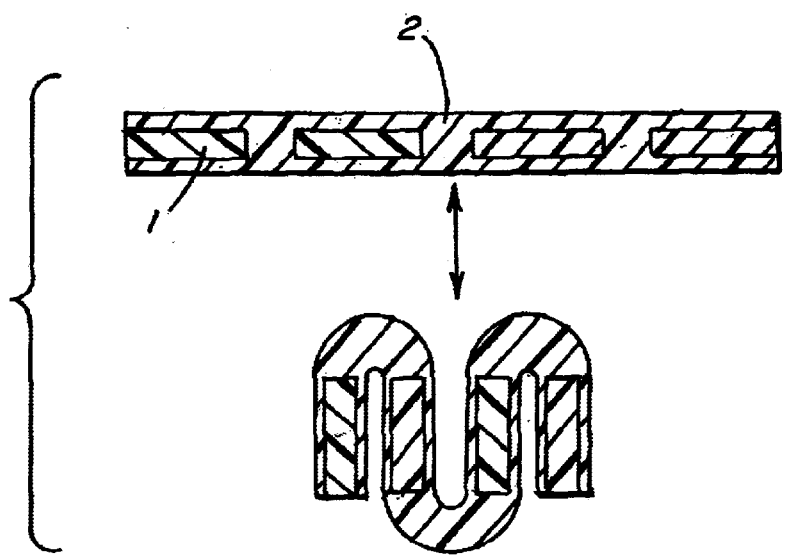
Figure 7:
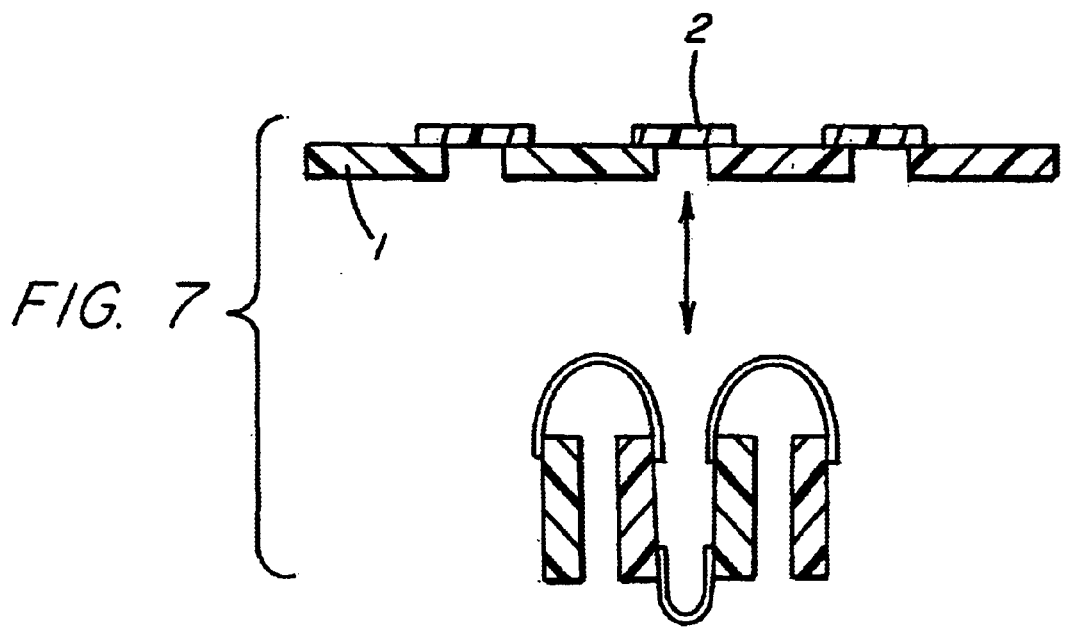
Figure 8:
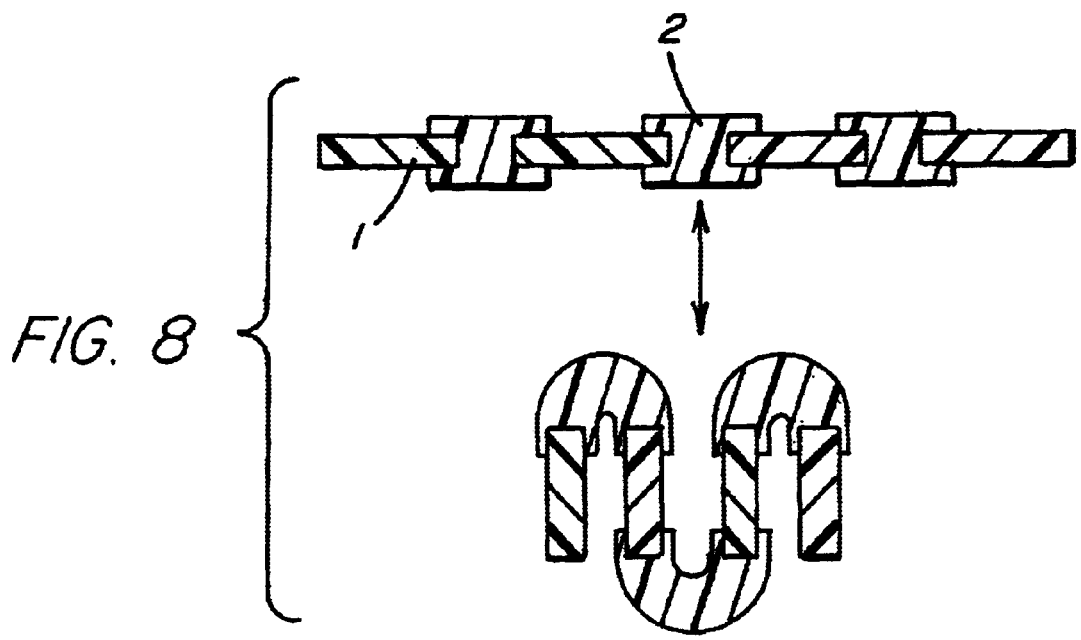

FIGS. 1 through 8 illustrate composites systems of the present invention in both the unfolded and folded state. In FIGS. 1 through 8, at least two parts (1) made of thermoplastic materials are joined together by at least one connecting member (2) made of TPU.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A transparent, light-stable, movable composite system comprising:

i) at least two rigid parts made of transparent, light-stable, thermoplastic materials from the group consisting of polycarbonate, polymethylene methacrylate, polyvinylbutyrate, polyamide, polybutylene terephthalate, polyethylene terephthalate, polyvinyl chloride, ethylenevinylacetate copolymer, mixtures and blends thereof which are joined together at one edge by ii) at least one flexible connecting member made of transparent, light-stable thermoplastic polyurethane having a 0 to 20% haze value at a thickness of 1 mm (according to ISO 14782), a Shore hardness within the range of from about 60 Shore A to about 70 Shore D (according to ISO 868) and a yellowness index of 0 to 25 at a thickness of 1 mm (according to ASTM E 313), the connecting member forming a reversible joint which can be folded by an angle of up to 180°.

2. The composite system of claim 1 in which the transparent, thermoplastic materials are transparent polycarbonate.

3. The composite system of claim 1 in which the parts of transparent, thermoplastic materials have a thickness within the range of from about 50 μm to about 2 mm.

4. The composite system of claim 1 in which the parts of transparent, thermoplastic materials are in the form of sheets.

5. The composite system of claim 1 in which the parts of transparent, thermoplastic materials are in the form of solid sheets.

6. The composite system of claim 1 in which the parts of transparent, thermoplastic materials are in the form of twin-wall sheets.

7. The composite system of claim 1 in which the parts of transparent, thermoplastic materials have a three-dimensional shape.

8. The composite system of claim 1 in which the thermoplastic polyurethane is an aliphatic thermoplastic polyurethane.

9. The composite system of claim 1 in which the connecting member of thermoplastic polyurethane has a thickness within the range of from about 100 μm to about 2 mm.

10. The composite system of claim 1 in which the connecting member made of thermoplastic polyurethane is located either over a part of the surface or over the whole surface of the parts made of thermoplastic materials.

11. A folding roof which is composed of the transparent, light-stable, movable composite system of claim 1.

12. A folding blind which is composed of the transparent, light-stable, movable composite system of claim 1.

13. A movable, alignable support for a photovoltaic solar energy collector which is composed of the transparent, light-stable, movable composite system of claim 1.

* * * * *